United States Patent
Li et al.

(10) Patent No.: US 11,282,035 B2
(45) Date of Patent: Mar. 22, 2022

(54) PROCESS ORCHESTRATION

(71) Applicant: ACCENTURE GLOBAL SOLUTIONS LIMITED, Dublin (IE)

(72) Inventors: Chung-Sheng Li, Scarsdale, NY (US); Suraj Govind Jadhav, Mumbai (IN); Saurabh Mahadik, Mumbai (IN); Prakash Ghatage, Bangalore (IN); Guanglei Xiong, Fremont, CA (US); Emmanuel Munguia Tapia, Newark, CA (US); Mohammad Jawad Ghorbani, Foster City, CA (US); Kyle Johnson, San Francsico, CA (US); Colin Patrick Connors, Campbell, CA (US); Benjamin Nathan Grosof, Mercer Island, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 95 days.

(21) Appl. No.: 15/629,140

(22) Filed: Jun. 21, 2017

(65) Prior Publication Data

US 2018/0374051 A1 Dec. 27, 2018

(51) Int. Cl.
*G06Q 10/10* (2012.01)
*G06Q 10/06* (2012.01)

(52) U.S. Cl.
CPC ....... *G06Q 10/103* (2013.01); *G06Q 10/0633* (2013.01)

(58) Field of Classification Search
None
See application file for complete search history.

(56) References Cited

U.S. PATENT DOCUMENTS

| | | | | |
|---|---|---|---|---|
| 6,957,186 B1* | 10/2005 | Guheen | ........... | G06Q 99/00 705/323 |
| 8,073,731 B1* | 12/2011 | Rajasenan | ........... | G06Q 10/0637 705/7.42 |
| 2004/0254768 A1* | 12/2004 | Kim | ........... | G06Q 10/06 702/189 |
| 2005/0065941 A1* | 3/2005 | DeAngelis | ........... | G06Q 10/10 |
| 2007/0016573 A1* | 1/2007 | Nanavati | ........... | G06Q 10/06 |
| 2010/0121740 A1* | 5/2010 | Reed | ........... | G06Q 10/06 705/26.1 |
| 2011/0173146 A1* | 7/2011 | Hnatio | ........... | G06Q 10/06 706/14 |

(Continued)

FOREIGN PATENT DOCUMENTS

CN 104714941 A 6/2015

*Primary Examiner* — Andrew B Whitaker
(74) *Attorney, Agent, or Firm* — Mannava & Kang, P.C.

(57) ABSTRACT

Systems and methods for orchestrating a process are disclosed. In an implementation, a system is configured to extract process information associated with the process. Based on the process information, the system is configured to determine a current model of performing the process based on the process information. The system is further configured to retrieve regulatory information associated with the process, wherein the regulatory information is indicative of at least one of a predefined policy, a predefined rule, and a predefined regulation associated with the process. Further, the system is configured to update the current model based on at least one of the process information and the regulatory information for obtaining a predefined outcome of the process.

12 Claims, 7 Drawing Sheets

(56) References Cited

U.S. PATENT DOCUMENTS

| | | | |
|---|---|---|---|
| 2011/0267351 A1* | 11/2011 | Curbera | G06Q 10/06 |
| | | | 345/440 |
| 2015/0170084 A1 | 6/2015 | Byron et al. | |
| 2016/0080422 A1* | 3/2016 | Belgodere | G06N 5/046 |
| | | | 706/47 |
| 2016/0196587 A1* | 7/2016 | Eder | G06Q 30/00 |
| | | | 705/14.49 |
| 2017/0061956 A1* | 3/2017 | Sarikaya | G10L 15/005 |

* cited by examiner

PROCESS ORCHESTRATION

BACKGROUND

Generally, multiple business processes may be performed in departments within an Enterprise. Each of these business processes may be set up for a pre-specified objective with predefined outputs and performance metrics. Examples include a business process for managing the order tracking for assembly lines in manufacturing and a business process to manage enrollment of an healthcare provider to a healthcare payer. For better efficiency and ease of implementation of the delivery of business processes for the enterprises, various process related aspects, such as the backend and frontend IT systems, different roles of the involved personnel, events, tasks, business controls and applicable compliance requirements need to be modeled and managed. Management of the process aspects, may be referred to as process orchestration. The process orchestration is often used for management and optimization of processes in a variety of domains, such as business process management (BPM), workflow management, and robotic process automation (RPA).

In process orchestration, generally the steps associated with the process are predefined and a process flow, i.e., a sequence in which the steps are to be performed is also predefined. However, conventional approaches of process orchestration may have some shortcomings. For instance, as the steps and the order of the steps may be predefined, the process orchestration often becomes rigid with restricted adaptability and scalability. Because the factors based on which a process was orchestrated may not be static and may change, for instance, due to some anomaly, such rigid process orchestration may be incapable of dynamically adapting to a changing environment.

For example, owing to an incapability of the conventional approach to adapt to an anomaly, the process may be halted. This, in turn, may adversely affect an outcome of the process. The outcome may refer to the business or performance metric of the process, and may be expressed as a utility function of the attributes of the process. For example, in the case of a process pertaining to the manufacturing of an article, the way the article is manufactured (and hence the throughput and/or quality) may be affected. In general, the optimization of execution of a business process may mean to optimize the utility function associated with the outcome—which could include, for example, minimizing the cost (including personnel required to executed the process) associated with the process, maximizing the return generated for a given investment, minimizing the value at risk (usually for auditing and assurance), or maximizing the risk adjusted return.

Furthermore, currently, processes associated with the functioning, control, and management of an enterprise are evolving and changing from a process based model to an outcome driven model. As a result, an individual's discretion may play an important role in ensuring smooth and successful running of the process, for instance, in case of insurance claim processes. However, an ill-trained individual may not be able to take efficient decisions or may not be able to perform steps/tasks efficiently and may thus affect the outcome of the process. There may therefore be a need for systems and methods that can create a new process or alter a process automatically based on changed needs or circumstances and then execute the new or modified process automatically to achieve the desired outcome.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an embodiment of the present disclosure, systems and methods for orchestrating a process are described. In an embodiment, the orchestration of the process is outcome driven, i.e., based on an outcome of the process, the process may be modified. As a result, the process orchestration becomes adaptable and scalable.

In an example, in order to orchestrate a process, information associated with the process to be orchestrated may be extracted. The process information includes, for example, one or more operation attributes, one or more resources, a sequence of one or more steps, one or more event logs, and personnel information. Based on the process information, a current model of performing the process may be determined. Furthermore, regulatory information associated with the process may also be retrieved. Regulatory information may include predefined policies and/or rules associated with the process to be orchestrated. Subsequently, a current model for the process may be updated, based on the process information and/or the regulatory information. The current model is updated so as to achieve a predefine outcome of the process. Thus, an outcome of a process may be ensured even when aspects or conditions associated with the process change. Consequently, such orchestration of processes of an enterprise, may, in effect, result in better utilization of resources such as, for example, human, computational, or other resources.

Figure 1:
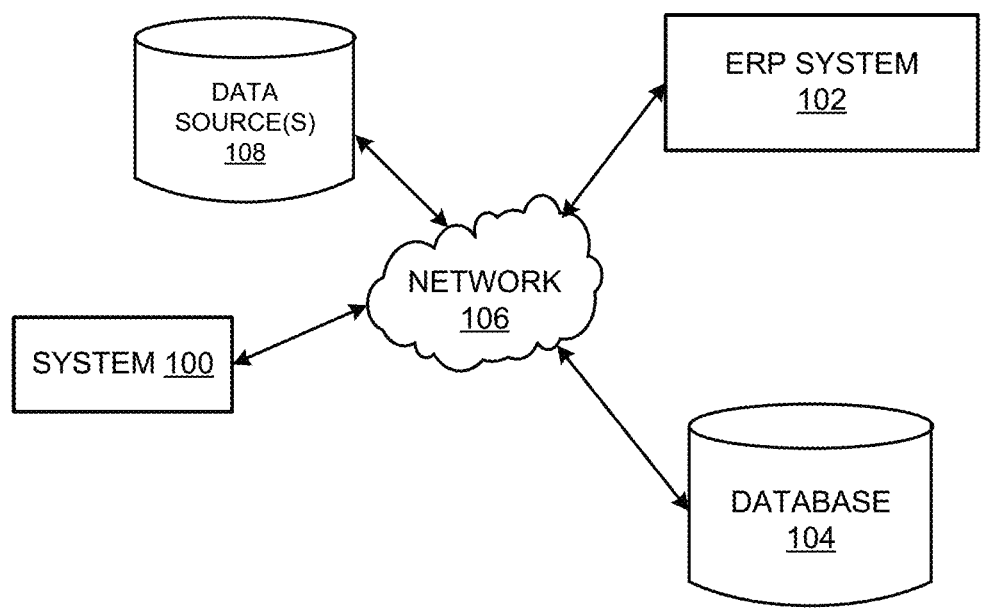
FIG. 1 shows a block diagram representation of a system for orchestrating a process, according to an example of the present disclosure.

FIG. 1 illustrates a block diagram representation an orchestration system 100, according to an example embodiment of the present disclosure. The orchestration system 100 may interchangeably be referred to as system 100, and may provide for orchestrating a process. The processes to be managed may relate to various domains of an enterprise, such as, for example, manufacturing, production, human resources, and accounting. Efficient orchestration may provide better performance of the processes, thereby saving on time and resources.

As may be understood, the system 100 may be implemented for orchestrating a single process or a plurality of processes. The plurality of processes may be implemented by a single enterprise or, in certain examples, may be implemented by more than one enterprise/organization. For the sake of brevity, the following description has been explained with reference to a single process. However, it will be appreciated that similar principles may be extended to other examples, where multiple processes or a process spanning across multiple enterprises are to be orchestrated.

In an example, the system 100 may be connected to an Enterprise Resource Planning (ERP) system 102 and a regulatory information database 104 through a network 106. The ERP system 102, in turn, may be associated with one or more data sources 108.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the Internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The ERP system 102 may be implemented as a standalone system or a combination of systems implemented by the enterprise for managing process information associated with the process. The process information may include, for example, information related to one or more operational attributes such as flow time, waiting time, processing time, and synchronization time associated with the process. The operational attributes may interchangeably be referred to as key performance indicators.

The process information may further include information indicative of one or more resources, for example, a hardware, a software, a system, a network, and the like used for implementing the process. Furthermore, in an example, the process information may include a process flow, i.e., a sequence of one or more steps associated with the process. The process information may further include personnel information associated with the process. The personnel information may be indicative of information associated with personnel involved with the project, corresponding role/designation of the personnel in the enterprise, and a social network map indicating the relationships between the personnel.

Furthermore, in an example, the process information may also include a plurality of event logs associated with the process. The event logs, in an example, may include information related to the operations, tasks, events, and/or steps related to the process. For example, an online food ordering process may include one or more steps, such as a selection of restaurant, a selection of food items, specifying the quantity of food items, making the payment for the food items, and delivering the food items. For each of the aforementioned steps, an event log may be registered as and when the step is performed. Further, each event log may also include additional information, such as a name of a personnel overlooking the step, time taken for performing the step, and the like.

The ERP system 102 may gather the process information from the data sources 108. The data sources 108 may include, for example, a data source associated information pertaining to models and a data source associated with event-log information. In example, the data sources 108 may also interact to process and update the data. For instance, a process information system (not shown) may manage the data sources 108. In an example, the functionalities of the process information management system may be integrated with the system 100. Alternatively, the process information management system may be provided as a spate standalone system coupled to the data sources 108 through the network 106.

In addition to the data sources 108, the regulatory information database 104, hereinafter referred to as the database 104, may be associated with the system 100. The database 104 may include regulatory information associated with the process. The regulatory information may include at least one of a defined rule, a defined policy, and a defined regulation associated with the process. For example, for an insurance process, the regulatory information may include information about regulations and policies defined by the government and/or an enterprise providing the insurance service. The database 104 may be regularly updated to reflect the changes that may be made to the regulatory information. For instance, if a new requirement is raised by the government pertaining to Know Your Customer (KYC) details for bank account holders, the same may be updated in the database 104. As a result, the change may be factored in, while performing the process orchestration.

As mentioned above, the system 100 may be implemented for orchestrating a process. In operation, the system 100 may determine a current model of performing the process prior to orchestrating the process. For determining the current model, the orchestration engine 104, in an example, extracts the process information from the ERP system 102, which is associated with multiple data sources 108.

Subsequently, the system 100 may determine a current model for performing the process, based on the process information. On determining the current model, in an embodiment, the system 100 may retrieve the regulatory information from the database 104. Based on at least one of the process information and the regulatory information, the system 100 may update the current model for obtaining a predefined outcome of the process. Thus, the current model may be enhanced to efficiently deliver the desired outcome without halting the process and/or wasting the resources.

Figure 2:
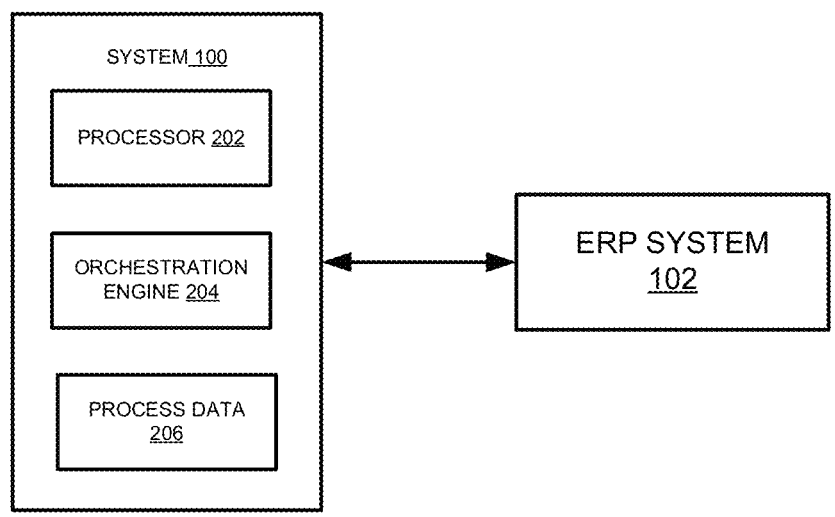
FIG. 2 shows various components of a system for orchestrating a process, according to an example of the present disclosure.

FIG. 2 illustrates various components of the system 100, according to an example embodiment of the present disclosure. In an example, the system 100 includes a processor 202, an orchestration engine 204, and process data 206. The orchestration engine 204 may be implemented as, signal processor(s), state machine(s), and/or logic circuitries. Further, the orchestration engine 204 can be implemented in hardware, instructions executed by a processing unit, or by a combination thereof. The processing unit can comprise a computer, a processor, a state machine, a logic array or any other suitable devices capable of processing instructions. The processing unit can be a specialized processor, which executes instructions to perform the required tasks.

In another aspect of the present disclosure, the orchestration engine 204 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium.

In an implementation, the orchestration engine 204 may determine a current model of performing the process prior to orchestrating the process. For determining the current model, the orchestration engine 204, in an example, extracts the process information from the ERP system 102. The process information may be stored in the process data 206.

For instance, for extracting the information related to operational attributes, the orchestration engine 204 may implement an enterprise process management tool, such as SIPOCs and process flow. In another example the orchestration engine 204 may implement a dialog management system for extracting the information related to the one or more resources, the personnel information, and the information related to the process flow. The dialog management system may interact with one or more users for obtaining the aforementioned information. In another example embodiment, an administrator may manually obtain and record the information related to the one or more resources, the personnel information, and the information related to the process flow. Further, the obtained information may be stored in the process data 206, which may be used for further analysis.

Furthermore, in an example, the orchestration engine 204 may extract the event logs from the ERP system 102. The event logs, which include time stamped sequence of the executed steps, facilitate reverse engineering the process model for the process. In an implementation, the orchestration engine 204 may implement at least one of a speech recognition technique, image analysis technique, video analysis technique, and natural language processing technique for collecting the unstructured data, such as speech, image, video, and text in the process information. The image analysis technique and the video analysis technique may include techniques for recognizing images/videos and understanding the recognized images/videos. These techniques may be used to extract process information.

On extracting the process information, the orchestration engine 204 may apply a data mining technique for determining the current model for performing the process. The data mining technique may include one or more of classification, clustering, prediction, and sequence pattern recognition. Accordingly, in an example, extracted data may be classified or clustered to determine a current model. In case where no model exists, the orchestration engine 204 may implement a first data mining technique. In said technique, based on an event log, a new model is constructed or discovered based on low-level events.

In another example, when an a priori model for performing the process exists, the orchestration engine 204 may implement a second data mining technique. In said technique, the existing model is compared with the process event log and discrepancies between the log and the model are analyzed. The aforementioned technique may be used to detect deviations to enrich the model. In an example, a process model may be enhanced, based on performance data, i.e., some a priori process model may be used to project the potential bottlenecks. In another example, the data mining technique may implement a decision miner, which takes an a priori process model and analyzes every choice in the process model. For each choice, the event log is consulted to see which information is typically available the moment the choice is made. Then classical data mining techniques are used to see which data elements influence the choice. Thus, a decision tree is generated for each choice in the process.

For instance, from the performance data pertaining to a KYC process, it may be determined that in cases where approval from a manager is required, a substantial amount of time is consumed in obtaining the approval. This may result in such KYC process taking longer than expected. The decision miner and the data mining may be performed to determine the cases in which the manager approval may be required and the cases in which the approval may be bypassed. Then, at least for the KYC cases where manager approval may be bypassed, the processing time may be reduced.

In yet another example, when an a priori model for performing the process exists, the orchestration engine 204 may implement a third data mining technique for determining the current model. In said technique, the process model is extended with a new aspect or perspective, so that the goal is not to check conformance, but rather to improve or enhance the existing model. An example may be the extension of a process model with performance data, i.e., some prior process model dynamically annotated with performance data. Referring to the example discussed above, an enhancement may indicate alternate customer details that may be provided to bypass the approval process.

On determining the current model, in an embodiment, the orchestration engine 204 may retrieve the regulatory information from the database 104. Subsequently, based on at least one of the process information and the regulatory information, the orchestration engine 204 may update the current model for obtaining a predefined outcome of the process.

In an embodiment, for updating the current model, the orchestration engine 204 may ascertain an outcome of the current model. Based on the ascertained outcome, the process information, and the regulatory information, the orchestration engine 204 may determine at least one alternative schema for the process. The alternative schema may include one or more alternate steps that may be adopted in place of the existing steps for performing the process.

In an example, the orchestration engine 204 may determine an outcome corresponding to an alternative schema (a.k.a. alternative process model). The orchestration engine 204 may then compare the ascertained outcome and the outcome corresponding to the alternative schema with a predefined outcome. By this comparison, the orchestration engine 204 determines which of the outcome corresponding to the alternative schema and the ascertained outcome is greater in similarity to the predefined outcome. In an example, when the outcome corresponding to the alternative schema is greater in similarity to the predefined outcome, the orchestration engine 204 may select the alternative schema for updating the current model.

In an embodiment, the orchestration engine 204 may examine an outcome for updating the system 100. For instance, the orchestration engine 204 may ascertain an outcome of the updated current model and may compare the outcome with the predefined outcome. In a case the outcome is outside a predefined threshold of the predefined outcome, an offset is identified. In such a case, the orchestration engine 204 is configured to select an alternative schema based on the offset.

In an example, the orchestration engine 204 may connect to Application Programming Interface (API) of one or more applications of the process, for example, through corresponding connectors of the applications. Further, in an embodiment, the system 100 may support scalability with legacy orchestrations systems (not shown in the figure) by providing support for receiving outcome from such legacy systems. For instance, in an example where multiple processes are present, one or more of the multiple process may be orchestrated using a conventional orchestration model, for instance, a role based orchestration model or a policy based orchestration model. In such a case, the system 100 may receive a result of the one or more process and may use the result for orchestrating the process based on the principles described above. Thus, system 100 provides support and scalability towards existing orchestration systems, in an example.

Figure 3:
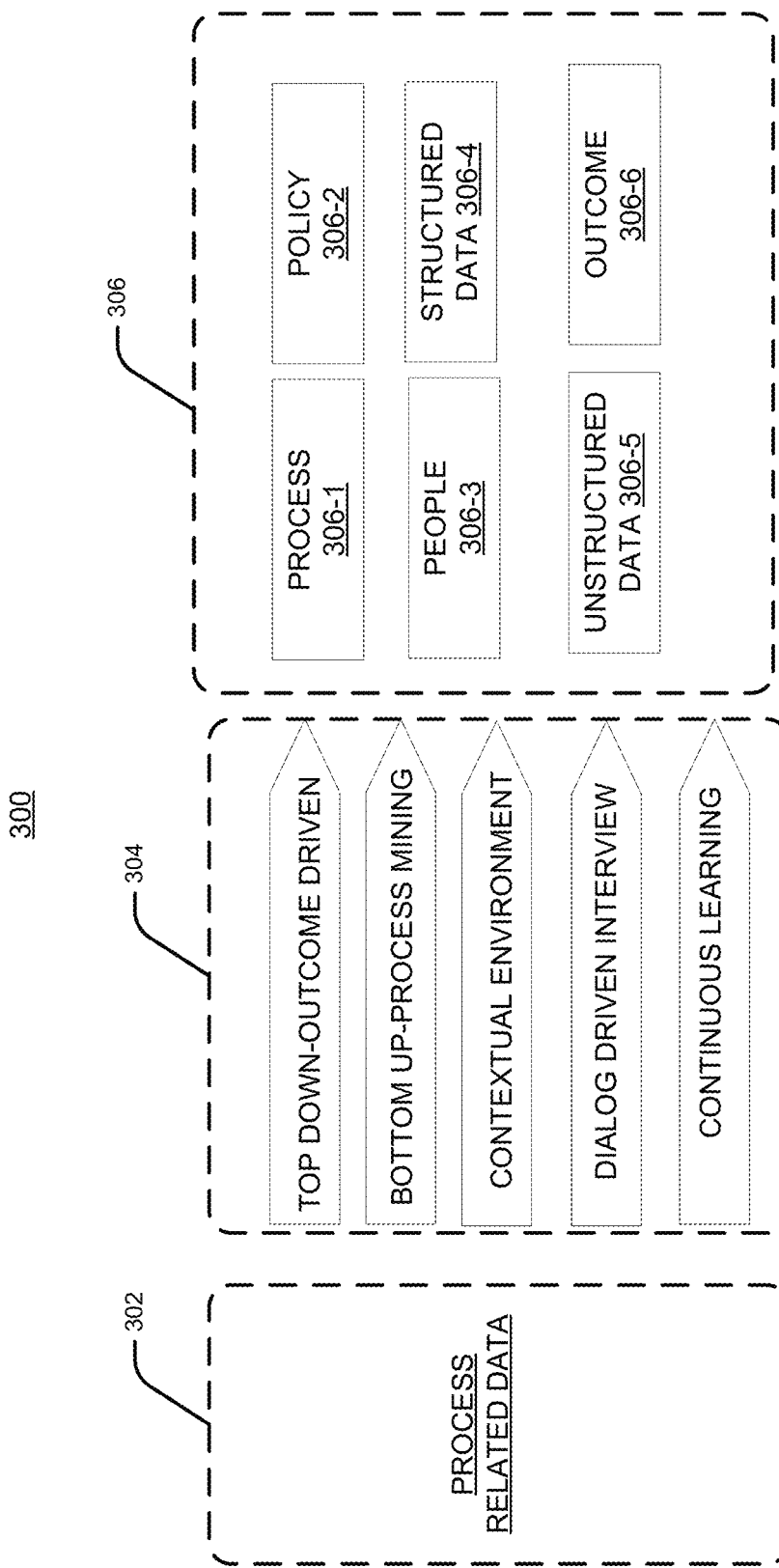
FIG. 3 shows a framework of process orchestration, according to an example of the present disclosure.

FIG. 3 illustrates a framework 300 of the present orchestration process, according to an example implementation of the present disclosure. The framework 300 illustrates various functional aspects of the present orchestration process. As illustrated, block 302 pertains to model related data, which forms the core of the present orchestration process. The model related data may include industry point of view (PoV), preferred practices on process models, data models, associated roles and associated policies. Block 304 indicates various aspects of the present orchestration process. In an example, considering a top down aspect, the present orchestration process is outcome driven, and in the bottom up aspect, the process mining is the core, where current model determination and subsequent enhancements are based on the process mining. Further, the present orchestration process factors in the contextual environment, implements dialog driven interview for information collection, and performs continuous learning.

Finally, block 306 illustrates various components on which the operations discussed under the block 304 may be performed, the component, which may be used to perform the present orchestration process or the result obtained on performing the present orchestration process. The components may include processes 306-1, policies 306-2, people 306-3, structured data 306-4, unstructured data, 306-5 and outcome 306-6. The processes may include control flow and data flow, which may be analysed to determine a model to be implemented. The policies may include policies pertaining to compliance, enterprise control, contractual policies, and service level agreements. The people component may include roles of various individuals involved in a process, roles in an organization, and information pertaining to individuals from social network. The structured data may include ERP data and Excel data, and the unstructured data may include email, scanned doc, and phone conversation. Finally, outcome component may be based on metrics, cost, and resources pertaining to enterprise as such or operations of the enterprise.

For the sake of explanation, and not as a limitation, the present disclosure is explained with respect to a few example scenarios. However, it will be appreciated that the present disclosure is not limited to these example scenarios and the similar principles may be extended to other domains as well.

Figure 4:
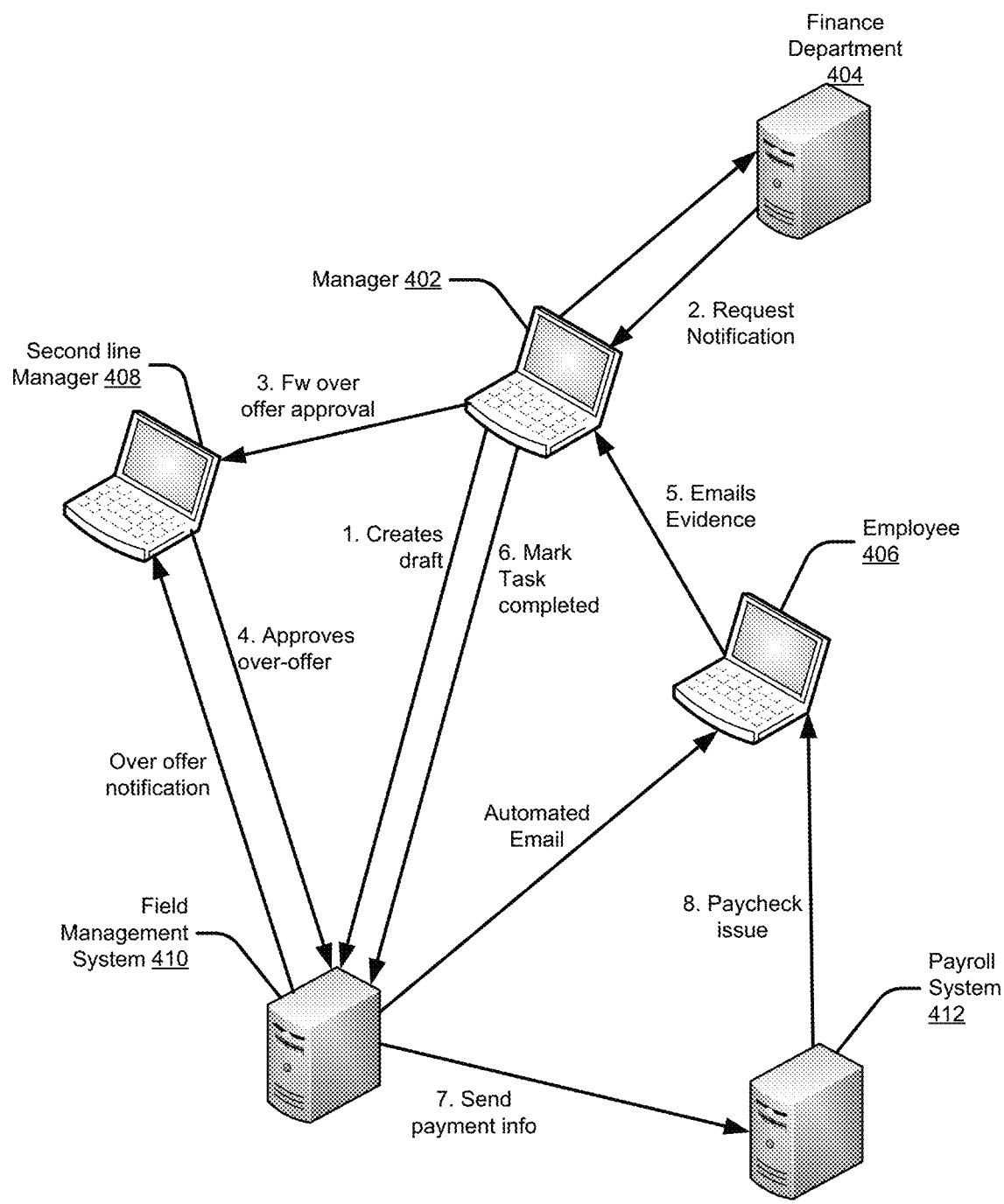
FIG. 4 schematic shows an example scenario implementing the process orchestration, according to an example of the present disclosure.

In an example, the system 100 may provide for orchestration of a payroll process schematically illustrated in FIG. 4. The illustrated process shows various steps for providing an over offer to a user. As shown, a first user 402, say a manager may create a draft for over offer to a second user 404, say, an employee in the manager's team. As per specified policies, the draft may be sent to finance department 406 for authorization. Upon authorization, the authorized over offer approval may be provided to a third user 408, say, a second line manager for approval. The second line manager 408 on approving the offer, may provide the over offer, i.e., details pertaining to the over offer to a field management system 410. The field management system 410 on successfully recording the over offer may provide a notification the second line manager 408. Furthermore, the field management system 410 may also provide an email notification regarding the over offer to the employee 404, who in turn may provide the email evidence to the manager 402. The manager 402 in turn may mark task as completed in his system.

In parallel to providing notification to the employee 404, the field management system 410 may also provide details pertaining to over offer to a payroll system 412 so that it may generate paychecks accordingly. Thus, it can be observed that multiple steps may be performed in predefined order, in case an over offer is provided to an employee.

As can be seen there are multiple actors and events involved in the above-discussed process. Non-occurrence of a single event may eventually halt the entire process. For instance, in case the second line manager 408 is not available, the payroll process for the employee may be halted and in certain extreme cases may result in non-payment of pay.

For efficient implementation of the payroll process, the present system 100 may gather data pertaining to actors and the events from the ERP system 102 to determine a current model. For instance, a data mining technique may analyze the extracted data (e.g., event logs, data pertaining to actors in the payroll process) to determine the current model. The data mining technique may implement feature extraction and sequential pattern prediction for generating the current model. The current model may indicate the above discussed process.

On determining the current model, the orchestration engine may also determine an alternative schema. For instance, the alternative schema may indicate that, in the absence of an actor, another actor at the same hierarchical level or at a higher level may be considered to make the process orchestration flexible to adapt to changing environment and/or to anomalies.

As mentioned above, the outcome of the alternative schema may be determined and compared with a predefined outcome to determine the model to be adapted. Thus, the payroll process may be orchestrated accordingly.

In another example, the system 100 may be implemented in a record to report (R2R) management process. In an example, in the R2R management process, accounts from a financial record, for example, a bank statement may be compared with a ledger. In an implementation, the system 100 may extract the process information related to the R2R management process and may learn about the operational attributes, the resources, the personnel, the event logs, the process flow, and the like related to the R2R management process. The system 100 may subsequently determine a current model for the R2R management process based on the process information. In an example, the system 100 may retrieve the regulatory information associated with the R2R management process. The regulatory information, in an example, facilitates the adaptability and scalability of the system 100. For instance, as an example, a new format as per a new rule may defined for the financial record. In such a case, the current model may not be able to adapt to the new format. Thus, a halt in the process may be observed. As mentioned, the system 100 takes into account the regulatory information, and is thus, updated with the new format. As a result, the system 100 is able to adapt to the new format and the R2R management process is implemented without any halt in operation.

In another example, the system 100 may be implemented in a health care onboarding process. The health care onboarding process typically includes a multi step validation process and requires accessing multiple data sources, such as personal documents and the like. For enrolling a health care provider in a health care program, credentials corresponding to the health care provider are established. Additionally, the health care provider's history, for instance, prior experience, may also be recorded. Conventional systems for orchestrating the health care onboarding process are typically reactive, time consuming, and are based on outdated information. Thus, probability of enrolling a health care provider based on outdated information may increase. As mentioned, the system 100 utilizes current regulatory information and is thus updated with latest rules, policies, and regulations. Thus, probability of an outdated health program with health care providers being sold to a user is reduced.

In yet another example, the system 100 may be implemented in a know your customer (KYC) process. Typically, enrollment of an individual in the KYC process is a tedious and cumbersome task. For instance, an identity of the individual is established, individual's demographic information is recorded, information about the family members is recorded, information about the individual's social network is recorded, and the like. Conventional systems implemented for orchestrating such a process may not be updated with latest regulations, rules, and policies. As a result, information recorded corresponding to the individual may be incomplete or incorrect. In such a case, additional resources may need to be implemented for obtaining the correct information. The system 100, in an example, retrieves regulatory information associated with the process. Thus, the system 100 is updated with the latest rules, regulations, and policies. As a result, correct information related to the individual is recorded.

Figure 5:
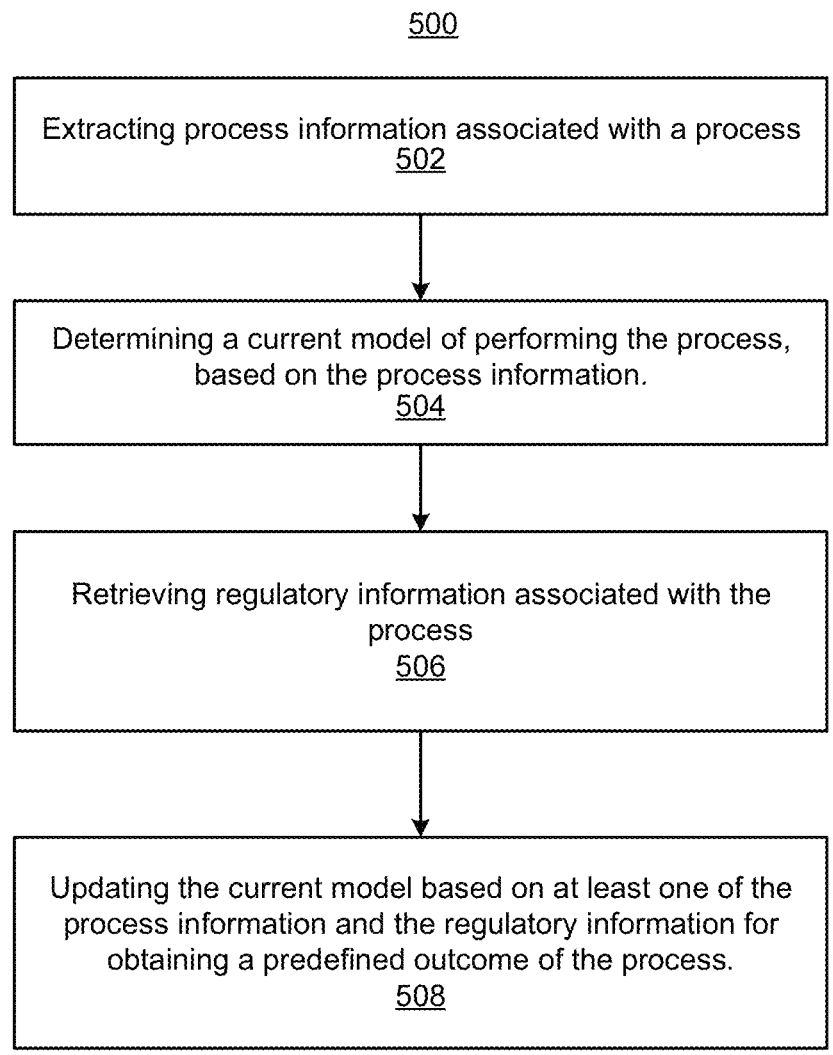
FIG. 5 shows a flow chart for orchestrating a process, according to an example of the present disclosure.
Figure 6:
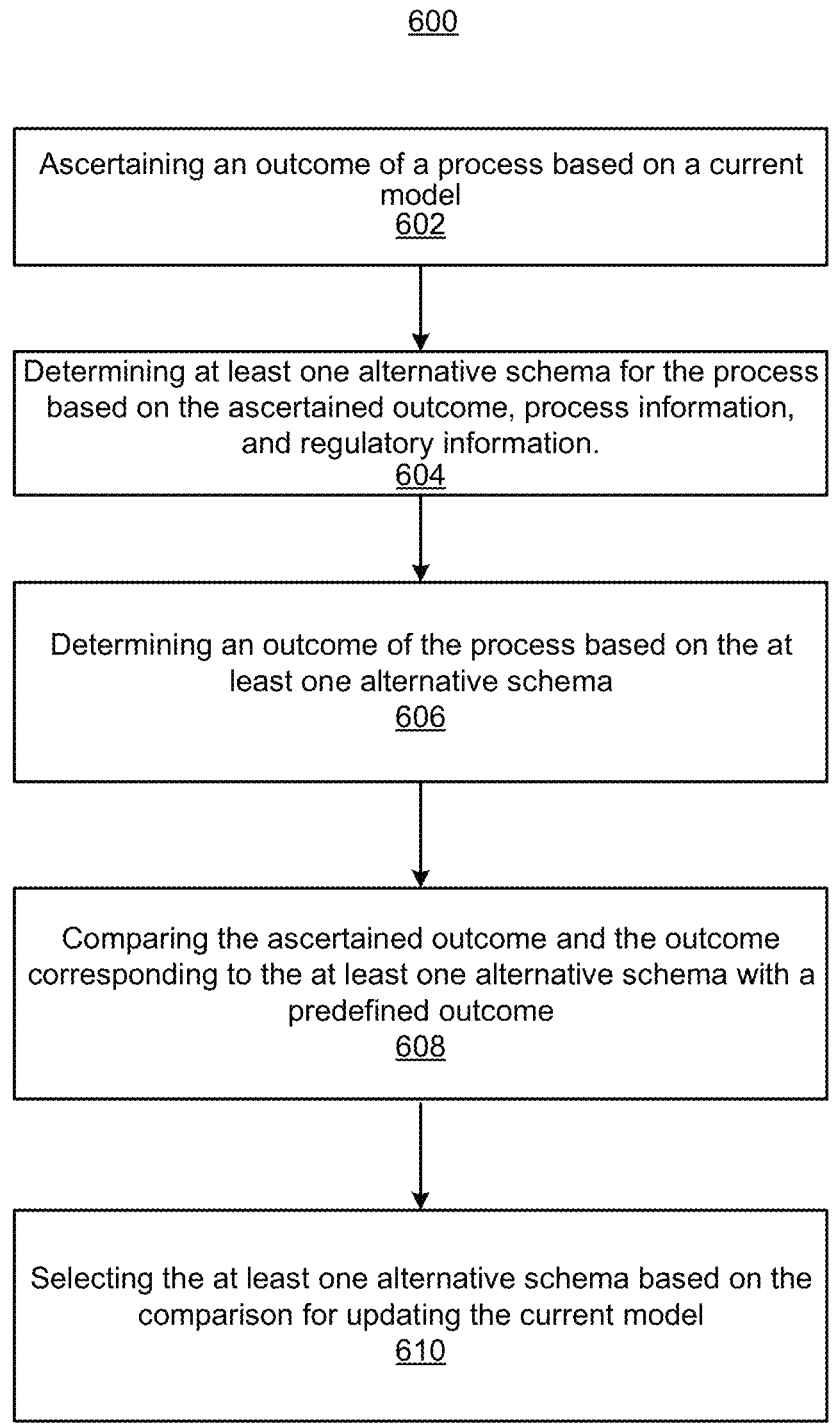
FIG. 6 illustrates a flow chart for updating a current model of performing a process, according to an example of the present disclosure.
Figure 7:
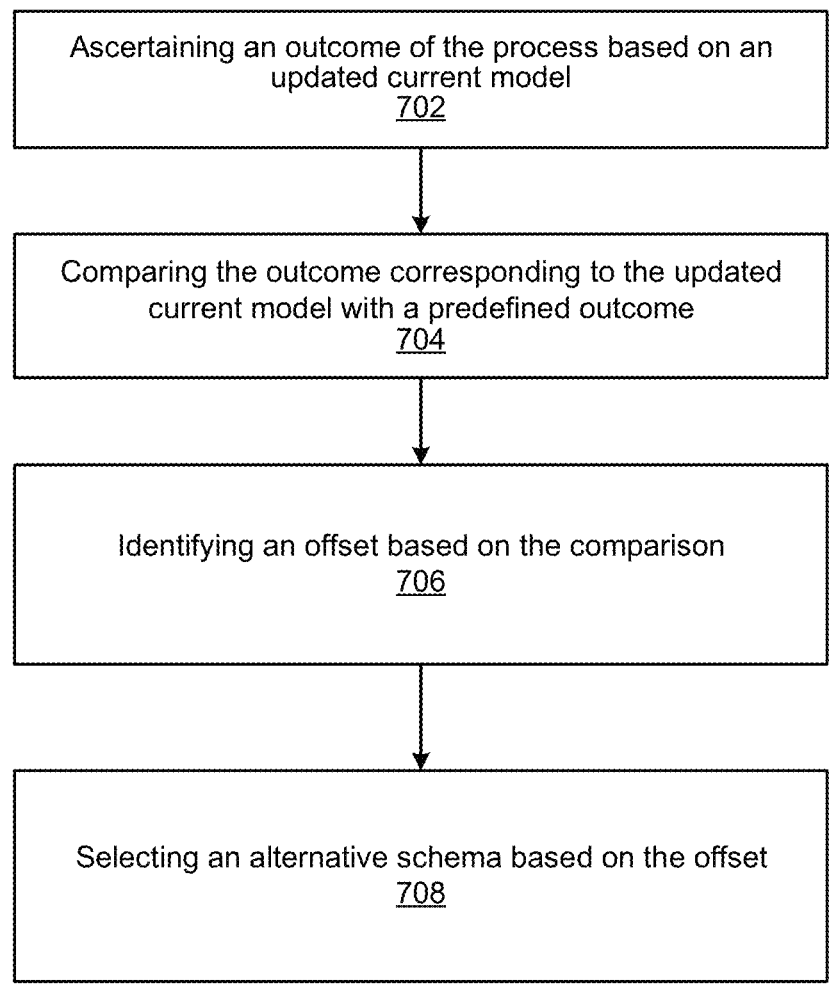
FIG. 7 illustrates a flow chart for orchestrating a process, according to an embodiment of the present disclosure.

FIG. 5 illustrates a method 500 for orchestrating a process, according to an embodiment of the present disclosure. FIG. 6 illustrates a method 600 for updating a current model of performing a process, according to an embodiment of the present disclosure. FIG. 7 illustrates a method 700 for orchestrating a process, according to an embodiment of the present subject matter. The methods 500, 600, and 700 may be performed by one or more servers or other types of computers including at least one processor executing machine readable instructions embodying the methods. For example, the system 100 shown in FIG. 1 may store machine readable instructions embodying the methods, and processor 202 may execute the machine readable instructions. The methods 500, 600, and 700 are described by way of example as being performed by the system 100.

Referring to FIG. 5, at 502, process information associated with a process is extracted. The process information, in an example, may include one or more operation attributes associated with the process. The process information may further include one or more resources associated with the process. Furthermore, the process information may include a sequence of one or more steps associated with the process. In addition, the process information may include one or more event logs associated with the process. The process information may also include personnel information associated with the process. The personnel information may include a role/designation of the personnel, information about whether the personnel is linked with the process, and a social network depicting the relationships between the personnel associated with the process. In an example, the orchestration engine 204 may extract the process information from the ERP system 102.

At 504, a current model of performing the process is determined based on the process information. In an example, the current model depicts at least a process flow, personnel, and parameters associated with the process. As described previously with reference to FIG. 1, any of the first data mining technique, the second data mining technique, and the third data mining technique may be implemented for determining the current model. The aforementioned data mining techniques, amongst other information, utilizes the event logs for determining the process. In an example, the orchestration engine 204 may determine the current model.

At 506, regulatory information associated with the process is retrieved. In an example, the regulatory information may include at least one of a predefined rule, a predefined policy, and a predefined business control associated with the process. The predefined rule, policy, and business control may be determined by an organization, such as a government body or by an enterprise or by a combination thereof. In an example, the orchestration engine 204 may retrieve the regulatory information from the database 104.

At 508, the current model is updated based on at least one of the process information and the regulatory information for obtaining a predefined outcome of the process. In an example, the orchestration engine 204 may update the current model.

Referring to FIG. 6, at 602, an outcome of the process based on the current model is ascertained. In an example, the orchestration engine 204 may ascertain the outcome of the process based on the current model.

At 604, at least one alternative schema of performing the method is determined based on the ascertained outcome, process information, and regulatory information. The alternative schema may include alternate or substitute steps of performing the process. The alternate or substitute steps may be used to replace one or more of the existing steps of the process. For instance, when a step of the process cannot be executed, the step may be replaced by an alternate or substitute step. In an example, the orchestration engine 204 may determine the alternative schema.

At 606, an outcome of the process based on the at least one alternative schema is determined. Once the alternate or substitute step is selected, the process may be performed based on the alternative schema and the outcome may be determined. In an example, the orchestration engine 204 may determine the outcome based on the at least one alternative schema.

At 608, the ascertained outcome and the outcome corresponding to the alternative schema are compared with a predefined outcome of the process. In an example, both, the outcome corresponding to the alternative schema and the ascertained outcome are compared with a predefined outcome of the process. Based on the comparison, the outcome greater in similarity to the predefined outcome is identified. In an example, the orchestration engine 204 may perform the comparison.

At 610, the at least one alternative schema is selected based on the comparison for updating the current model. In an example, if the outcome corresponding to the alternative schema is greater in similarity to the predefined outcome, the outcome corresponding to the alternative schema is selected. In an example, the orchestration engine 204 may select the alternative schema.

Referring to FIG. 7, at 702, an outcome of the process is ascertained based on the updated current model. In an example, the orchestration engine 204 may ascertain the outcome.

At 704, the outcome corresponding to the updated current model is compared with a predefined outcome. In an example, the orchestration engine 204 may compare the outcome corresponding to the update current model with the predefined outcome.

At 706, an offset is identified based on the comparison. In an example, when the outcome corresponding to the updated current model is not within a threshold of the predefined outcome, the offset is identified. In an example, the orchestration engine 204 may identify the offset.

At 708, an alternative schema for performing the process is selected based on the offset. In an example, when the offset is identified, a simulation of the process may be performed based on one or more alternative schemas. Subsequently, an alternative schema, the outcome of which is greatest in similarity to the predefined outcome, is selected. In an example, the orchestration engine 204 may select the alternative schema.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A system for orchestrating a process, the system comprising:
 a processor; and
 an orchestration engine coupled to the processor to:
  extract process information associated with the process, wherein the process information is indicative of:
   one or more operation attributes associated with the process, wherein the one or more operation attributes include at least one of flow time, waiting time, processing time, and synchronization time associated with the process;
   one or more resources associated with the process;
   a sequence of one or more steps associated with the process;
   one or more event logs associated with the process, wherein the one or more event logs including time stamped sequence of the executed steps associated with the process, facilitate reverse engineering for the process; and
   personnel information that includes information related to designations of personnel associated with the process and a social network indicative of relationships between the personnel associated with the process;
  determine a current model of performing the process, the current model depicting at least a process flow, personnel, and parameters associated with the process, wherein determining the current model further comprises:
   ascertaining whether an a priori model exists for performing the process;
   upon ascertaining that the priori model does not exist for performing the process, generating, based on the process information, the current model by applying a first data mining technique, the first data mining technique comprising at least one of classification, clustering, prediction, and sequence pattern recognition, the first data mining technique being applied to the extracted process information;
   upon ascertaining that the priori model exists for performing the process:
    implementing a second data mining technique to compare an existing model with the one or more event logs to determine deviations between the one or more event logs and the existing model and to analyse discrepancies between the one or more event logs and the existing model to enrich the existing model based on performance data, the second data mining technique analyzing each choice in the priori model, based on the one or more event logs associated with the process to determine information, which is available at a time the choice is made, the information being used to identify data elements influencing the choice; and
    based on the determined deviations and the information, enhancing the existing model to determine the current model;
  retrieve current regulatory information associated with the process from a database, wherein the regulatory information is indicative of a new format for a financial record, wherein the regulatory information includes a defined rule, a defined policy, and a defined regulation associated with the process, and wherein the database is updated to reflect changes made to the regulatory information; and
  update the current model with the new format and the defined rule, the defined policy, and the defined regulation associated with the process based on the process information and the regulatory information for obtaining a predefined outcome of the process, wherein to update the current model, the orchestration engine is to:
  ascertain an outcome of the process based on the current model;
  based on the ascertained outcome, determine a plurality of alternative schemas for updating the current model, the designations of the personnel associated with the process, the social network indicative of the relationships between the personnel associated with the process, and the regulatory information, the at least one alternative schema to include an alternate step to be adopted by an alternative person when an assigned person for performing an existing step of the process is unavailable, wherein the alternative person is identified based on the social network indicative of the relationships between the personnel associated with the process;
  compare the ascertained outcome with the predefined outcome;
  identify an offset when the ascertained outcome is outside a predefined threshold of the predefined outcome;
  upon the identification of the offset, perform simulation of the process based on the plurality of alternate schemas; and
  select, based on the offset and extent of similarity of outcome for each respective alternate schema to the predefined outcome, an alternative schema from among the plurality of alternate schemas, wherein the selected alternative schema proactively implements the alternate step based on the retrieved current regulatory information.

2. The system as claimed in claim 1, wherein the orchestration engine is further to connect to an application programming interface (API) of at least one application associated with the process through a connector.

3. The system as claimed in claim 1, wherein the orchestration engine is further to implement at least one of a speech recognition technique, image analysis technique, and video analysis technique for collecting the process information.

4. The system as claimed in claim 1, wherein the orchestration engine is to implement a third data mining technique for enhancing the current model, based on a new aspect associated with the process.

5. The system as claimed in claim 1, wherein the orchestration engine is to implement a dialog management system to interact with a user to extract the personnel information, information related to the one or more resources, and information pertaining to a sequence of one or more steps.

6. A method of orchestrating a process, the method comprising:
    extracting process information associated with the process, wherein the process information is indicative of at least one of:
    one or more operation attributes associated with the process, wherein the one or more operation attributes include at least one of flow time, waiting time, processing time, and synchronization time associated with the process;
    one or more resources associated with the process;
    a sequence of one or more steps associated with the process;
    one or more event logs associated with the process, wherein the one or more event logs including time stamped sequence of the executed steps associated with the process, facilitate reverse engineering for the process; and
    personnel information associated with the process, wherein the personnel information includes information related to designations of personnel associated with the process and a social network indicative of relationships between the personnel associated with the process;
    determining a current model of performing the process, the current model depicting at least a process flow, personnel, and parameters associated with the process, wherein determining the current model further comprises:
        ascertaining whether an a priori model exists for performing the process;
        upon ascertaining that the priori model does not exist for performing the process, generating, based on the process information, the current model by applying a first data mining technique, the first data mining technique comprising at least one of classification, clustering, prediction, and sequence pattern recognition, first data mining technique being applied to the extracted process information;
        upon ascertaining that the priori model exists for performing the process:
            implementing a second data mining technique to compare an existing model with the one or more event logs to determine deviations between the one or more event logs and the existing model and to analyse discrepancies between the one or more event logs and the existing model to enrich the existing model based on performance data, the second data mining technique analyzing each choice in the priori model, based on the one or more event logs associated with the process to determine information, which is available at a time the choice is made, the information being used to identify data elements influencing the choice; and
            based on the determined deviations and the information, modifying the existing model to determine the current model;
    retrieving current regulatory information associated with the process from a database, wherein the regulatory information is indicative of a new format for a financial record, wherein the regulatory information includes a defined rule, a defined policy, and a defined regulation associated with the process, and wherein the database is updated to reflect changes made to the regulatory information; and
    updating the current model with the new format and the defined rule, the defined policy, and the defined regulation associated with the process based on the process information and the regulatory information for obtaining a predefined outcome of the process, wherein updating the current model comprises:
        ascertaining an outcome of the process based on the current model;
        based on the ascertained outcome, determining a plurality of alternative schemas for updating the current model, the designations of the personnel associated with the process, the social network indicative of the relationships between the personnel associated with the process, and the regulatory information, the at least one alternative schema to include alternate steps to be adopted by an alternative person when an assigned person for performing an existing step of the process is unavailable, wherein the alternative person is identified based on the social network indicative of the relationships between the personnel associated with the process;
        comparing the ascertained outcome with the predefined outcome;
        identifying an offset when the ascertained outcome is outside a predefined threshold of the predefined outcome;
        upon the identification of the offset, performing simulation of the process aced on the plurality of alternate schemas; and
        selecting, based on the offset and extent of similarity of outcome for each respective alternate schema to the predefined outcome, an schema from among the plurality of alternate schemas, wherein the selected alternative schema proactively implements the alternate step, based on the retrieved current regulatory information.

7. The method as claimed in claim 6, wherein the method further comprises implementing at least one of a speech recognition technique, image analysis technique, and video analysis technique for collecting the process information.

8. The method as claimed in claim 6, wherein modifying the existing model to determine the current model comprises:
    implementing the second data mining technique to perform at least one of enriching the current model and enhancing the current model, based on a new aspect associated with the process.

9. A non-transitory computer-readable medium comprising: instructions that, when executed by a processor, cause the processor to perform a method of orchestrating a process, the method comprising:
- extracting process information associated with the process, wherein the process information is indicative of at least one of:
  - one or more operation attributes associated with the process, wherein the one or more operation attributes include at least one of flow time, waiting time, processing time, and synchronization time associated with the process;
  - one or more resources associated with the process;
  - a sequence of one or more steps associated with the process;
  - one or more event logs associated with the process, wherein the one or more event logs including time stamped sequence of the executed steps associated with the process, facilitate reverse engineering for the process; and
  - personnel information associated with the process, wherein the personnel information includes information related to designations of personnel associated with the process and a social network indicative of relationships between the personnel associated with the process;
- determining a current model of performing the process, the current model depicts at least a process flow, personnel, and parameters associated with the process, wherein determining the current model further comprises:
  - ascertaining whether an a priori model exists for performing the process;
  - upon ascertaining that the priori model does not exist for performing the process, generating, based on the process information, the current model by applying a first data mining technique, the first data mining technique comprising at least one of classification, clustering, prediction, and sequence pattern recognition, the first data mining technique being applied to the extracted process information;
  - upon ascertaining that the priori model exists for performing the process:
    - implementing a second data mining technique to compare an existing model with the one or more event logs to determine deviations between the one or more event logs and the existing model and to analyse discrepancies between the one or more event logs and the existing model to enrich the existing model based on performance data, the second data mining technique analyzing each choice in the priori model, based on the one or more event logs associated with the process to determine information, which is available at a time the choice is made, the information being used to identify data elements influencing the choice; and
    - based on the determined deviations and the information, modifying the existing model to determine the current model;
- retrieving current regulatory information associated with the process from a database, wherein the regulatory information is indicative of a new format for a financial record, wherein the regulatory information includes a defined rule, a defined policy, and a defined regulation associated with the process, and wherein the database is updated to reflect changes made to the regulatory information; and
- updating the current model with the new format and the defined rule, the defined policy, and the defined regulation associated with the process based on the process information and the regulatory information for obtaining a predefined outcome of the process, wherein updating the current model comprises:
  - ascertaining an outcome of the process based on the current model;
  - based on the ascertained outcome, determining a plurality of alternative schemas for updating the current model, the designations of the personnel associated with the process, the social network indicative of the relationships between the personnel associated with the process, and the regulatory information, the at least one alternative schema to include an alternate step to be adopted by an alternative person when an assigned person for performing an existing step of the process is unavailable, wherein the alternative person is identified based on the social network indicative of the relationships between the personnel associated with the process;
  - comparing the ascertained outcome with the predefined outcome;
  - identifying an offset when the ascertained outcome is outside a predefined threshold of the predefined outcome;
  - upon the identification of the offset, performing simulation of the process based on the plurality of alternate schemas; and
  - selecting, based on the offset and extent of similarity of outcome for each respective alternate schema to the predefined outcome, an alternative schema from among the plurality of alternate schemas, wherein the alternative schema proactively implements the alternate step based on the retrieved current regulatory information.

10. The non-transitory computer-readable medium of claim 9, wherein the processor further is to connect to an application programming interface (API) of at least one application associated with the process through a connector.

11. The non-transitory computer-readable medium of claim 9, wherein the processor further is to implement at least one of a speech recognition technique, image analysis technique, video analysis technique, and natural language processing technique for collecting the process information.

12. The non-transitory computer-readable medium of claim 9, wherein to modify the existing model to determine the current model the processor is to implement the second data mining technique for performing at least one of enriching the current model, and enhancing the current model, based on a new aspect associated with the process.

* * * * *